United States Patent [19]

Thompson et al.

[11] Patent Number: 5,486,764
[45] Date of Patent: Jan. 23, 1996

[54] METHOD FOR DETERMINING SUBSURFACE ELECTRICAL RESISTANCE USING ELECTROSEISMIC MEASUREMENTS

[75] Inventors: Arthur H. Thompson; Grant A. Gist, both of Houston, Tex.

[73] Assignee: Exxon Production Research Company, Houston, Tex.

[21] Appl. No.: 4,959

[22] Filed: Jan. 15, 1993

[51] Int. Cl.$^6$ .......................... G01V 11/00; G01V 3/12; G01V 3/30; G01V 1/00
[52] U.S. Cl. .......................... 324/323; 324/334; 324/344; 324/347; 367/14
[58] Field of Search .................................. 324/323, 347, 324/337, 336, 332, 348, 354, 357, 334, 344, 345, 346; 367/14, 37, 38

[56] References Cited

U.S. PATENT DOCUMENTS

| | | |
|---|---|---|
| 2,054,067 | 9/1936 | Blau et al. . |
| 2,148,679 | 2/1939 | Blau et al. ............... 324/348 |
| 2,156,259 | 5/1939 | Blau . |
| 2,354,659 | 8/1944 | Bazhaw et al. . |
| 2,805,727 | 9/1957 | Bazhaw ................... 324/348 |
| 3,384,811 | 5/1968 | Ikrath et al. . |
| 3,392,327 | 8/1968 | Zimmerman, Jr. . |
| 3,524,129 | 8/1970 | Ikrath . |
| 3,621,380 | 11/1971 | Barlow, Jr. . |
| 3,975,694 | 8/1976 | Melamed et al. . |
| 4,104,611 | 8/1978 | Kalden . |
| 4,507,611 | 3/1985 | Helms ................... 324/348 X |
| 4,601,022 | 7/1986 | Muir ........................... 367/14 |
| 4,612,506 | 9/1986 | Varotsos et al. ............ 324/348 |
| 4,692,905 | 9/1987 | Sobolev et al. . |
| 4,774,469 | 9/1988 | Sobolev et al. . |
| 4,837,582 | 6/1989 | Takahashi et al. . |
| 4,904,942 | 2/1990 | Thompson . |
| 4,904,943 | 2/1990 | Takahashi . |
| 4,931,739 | 6/1990 | MacLaren . |
| 5,041,792 | 8/1991 | Thompson . |

OTHER PUBLICATIONS

S. T. Martner and N. R. Sparks, "The Electroseismic Effect", *Geophysics,* vol. XXIV, No. 2 (Apr. 1959), pp. 297–308.
R. A. Broding, S. D. Buchanan and D. P. Hearn, "Field Experiments on the Electroseismic Effect", *IEEE Transactions on Geoscience Electronics,* Dec. 1963, pp. 23–31.
L. T. Long and W. K. Rivers, "Field Measurement of the Electroseismic Response", *Geophysics,* vol. 40, No. 2 (Apr. 1975), pp. 233–245.
Asch et al., "The Study of the Interaction of Seismic Waves and the Electrical Properties of Rocks", Preliminary Final Report to the National Science Foundation, Jan. 27, 1988, pp. 1–36.

*Primary Examiner*—Walter E. Snow
*Attorney, Agent, or Firm*—Pravel, Hewitt, Kimball & Krieger

[57] ABSTRACT

A method and apparatus for estimating the earth's resistance (conductivity) as a function of depth using electroseismic prospecting (ESP) or inverse ESP techniques. Resistance is determined by the frequency-dependent attenuation of reflected EM signals which are produced by application of seismic signals to the earth. A seismic wave is generated by conventional means into the earth, and EM waves are generated back to the surface by different reflectors at different depth levels. This propagation attenuates the high frequencies preferentially. EM waves generated at lower depths are further attenuated relative to those waves generated at more shallow depths. The method and apparatus determines the difference in spectral content between the reflected signals from different horizons based on their relative attenuation and uses this difference as a direct measure of the conductivity between the horizons. Inverse ESP effects can also be used to generate EM waves into the earth and use reflected seismic waves to determine resistance as a function of depth.

28 Claims, 2 Drawing Sheets

METHOD FOR DETERMINING SUBSURFACE ELECTRICAL RESISTANCE USING ELECTROSEISMIC MEASUREMENTS

SPECIFICATION

1. Field of the Invention

The present invention relates to the acquisition of electroseismic data, and more particularly to the use of the depth-dependent relative attenuation of electromagnetic or seismic signals to estimate conductivity of a formation as a function of depth.

2. Description of the Related Art

Conventional seismic prospecting is usually accomplished by generating acoustic waves from one or more seismic sources and then detecting reflections of those waves by interfaces in the earth formation being analyzed. Energy, usually in the form of an impulse from an explosion, is introduced into the ground at or near the surface. Spreading out from the source, the acoustic or seismic waves encounter discontinuities in the physical properties of the rocks and formations comprising the earth. Discontinuities of exploration interest, referred to as reflectors, are interfaces between different types of rock or formations. Upon encountering a reflector, the seismic waves are partially reflected back to the surface, where they are detected and recorded. The time required for the reflected energy to return indicates the depth of a reflector. Plotting this time for each detected signal while moving along the surface produces a picture of the rock layers below from shallow depths to the deepest interface from which returning energy is measurable.

A common seismic source for reflection seismology is dynamite at the bottom of a water-filled hole drilled through the weathered layer. The weathered layer, also referred to as the low-velocity layer (LVL), is defined as soil and rock near the surface. The weathered layer is generally poorly consolidated and absorbs the energy of explosions and thus is avoided whenever possible. Detectors used in land exploration, called geophones, measure the vertical and/or horizontal component of the reflected seismic wave, which is the time derivative of the displacement of the surface.

A different method of prospecting involves determining the electrical resistivity (or conductivity) of formations as a function of depth. Conventional electromagnetic methods use either active sources of EM radiation on the earth's surface or passive environmental EM sources to determine the electrical resistivity below the surface. However, the earth is a good electrical conductor and tends to shield its interior from electric fields. Maxwell's equations from electromagnetic theory applied to electromagnetic propagation indicate that significant penetration into the earth is only possible at low frequencies. For example, in magnetotellurics, frequencies near $10^{-3}$ Hz are typically used to obtain depth penetration of 20,000 feet or more.

A common measure of the attenuation of electric fields due to penetration in a conductor is referred to as the skin depth. The skin depth ($\delta$) is the depth at which fields have decreased to $1/e$ (about 36.97%) of their values at the surface. The characteristic attenuation length or skin depth (in feet) is $$\delta = \frac{1638}{\sqrt{\sigma f}}$$

where $\sigma$ is the earth conductivity in $\Omega^{-1}m^{-1}$ and f is the frequency.

The amplitude of an electric field in the earth is attenuated such that $E \propto \exp(-z/\delta)$ where z is the depth relative to the earth's surface. Formation conductivities in sedimentary basins typically range between 1 and 0.01 $\Omega^{-1}m^{-1}$. For example, if $\sigma=0.1$ $\Omega^{-1}m^{-1}$, then $\delta=5180f^{-\frac{1}{2}}$, and typical skin depths are as follows:

TABLE I

| $\delta$ (Feet) | f (Hz) | Distance Where Signal is Reduced by 10X |
|---|---|---|
| 52,000 | 0.01 | 120,000 feet |
| 5,200 | 1.00 | 12,000 feet |
| 1,645 | 10.00 | 3,780 feet |
| 520 | 100.00 | 1,200 feet |

In the table above, EM attenuation reduces the EM signal amplitude by a factor of 10 when $\exp(-z/\delta)=0.1$ or $z/\delta=2.3$. Representative numbers are shown in the third column of Table 1 above.

The numbers in Table 1 show that penetration to useful depths into the earth is possible only at the lower frequencies. At the same time, the EM wavelength at low frequencies is very long and limits resolution. The resolution of an EM experiment depends on several factors, but the spatial resolution is generally comparable to the skin depth $\delta$. The EM wave resolution is substantially poorer than the resolution of seismic waves since the seismic velocity and wavelength are approximately 100 times smaller than the speed and wavelength of light or EM energy in the earth. Therefore, EM waves generally provide poor resolution in estimating the electrical resistivity of earth formations.

Another problem with using electromagnetic waves in subsurface exploration is that EM waves, particularly their high frequency components, are attenuated much more than are seismic waves below the LVL. Transmission of EM waves depends on the electrical properties of the respective formation. In contrast, seismic signals are attenuated by scattering caused by contrast in elastic properties. Due to the much greater attenuation, EM waves have not been extensively used in deep subsurface exploration.

Background on electroseismic prospecting (ESP) is deemed appropriate. Various subsurface exploration techniques in addition to traditional acoustical detection described above have been developed. One technique that has been recently developed is referred to as electroseismic prospecting or ESP. A method and apparatus for performing ESP is described in U.S. Pat. No. 5,904,942. In ESP, seismic energy applied to the earth by an explosion or seismic blast is converted into electromagnetic energy (seismoelectric conversion) in a formation or subsurface structure of interest (the "horizon") where mobile, conducting fluids are encountered, and this EM energy is detected and analyzed.

As described in U.S. Pat. No. 4,904,942, there are several possible theories that may explain the conversion of seismic energy into electromagnetic energy in certain earth formations, including resistance modulation, spontaneous potentials, and electrocapillarity. However, the theory that best explains the conversion of seismic energy into electromagnetic energy is referred to as the "streaming potential" theory. This theory analyzes what occurs when a seismic wave impacts a porous lithological formation containing fluid, thereby causing fluid movement in the formation. The effect is most pronounced when there is the presence of at least two immiscible fluids, such as oil and water or gas and water in the formation. The phenomenon also exists in the presence of a lithological structure of high permeability where there is pore fluid in the structure.

In accordance with this theory, a molecular bond attraction exists between the fluid and the porous surface of the solid formation, and these bonds are distorted or broken with the rapid movement of the fluid upon contact by an acoustical wavefront, thereby inducing in a dipole manner an electromagnetic response. The fluid movement accompanying a seismic pressure gradient is described by M. A. Biot in papers published by the Journal of the Acoustical Society of America in 1956 and 1962, at page 168 of volume 28 and page 1254 of volume 34, respectively. Others, such as J. O. Bockris and A. K. N. Reddy, have experimented with the streaming potential effect and reported circa 1973 on their findings. The effect has been utilized in electroseismic prospecting as described in U.S. Pat. No. 4,904,942.

In addition, an effect known as inverse ESP occurs when electromagnetic energy is applied to the earth and this EM energy is converted into seismic energy (electroseismic conversion) upon contact with a formation, upon which the seismic energy is reflected back to the earth's surface. For more information on the inverse ESP effect, please see related copending application Ser. No. 07/696,059, filed May 6, 1991, which is hereby incorporated by reference. In both ESP and inverse ESP, a subsurface structure of interest (a horizon) is detected by the conversion between seismic and electromagnetic energy.

SUMMARY OF THE INVENTION

The present invention comprises a method and apparatus for estimating the earth's resistance (conductivity) as a function of depth using ESP and inverse ESP techniques. Resistance is determined by the relative attenuation of reflected EM or seismic signals from different reflectors which are produced by application of seismic or EM signals, respectively, to the earth.

In one embodiment a seismic wave is generated into the earth by conventional means and propagates to a first horizon at a first depth referred to as $z_1$. Seismoelectric conversion occurs at this first horizon, and the locally generated EM pulse has the full frequency content of the seismic wave at that first horizon. The EM wave is attenuated as it propagates back to the earth's surface. This propagation preferentially attenuates the high frequency components of the wave. Later in time the original downgoing seismic wave encounters a second horizon at a greater depth, referred to as $z_2$, where seismoelectric conversion again occurs to produce a second EM signal. The second EM wave is also attenuated as it propagates back to the surface, but now the high frequencies of the second EM wave are further attenuated relative to the first EM wave from the first horizon. The method and apparatus determines the difference in spectral content between the EM signals from the two horizons based on their relative attenuation and uses this difference as a direct measure of the conductivity between the two horizons.

In using the relative attenuation of the two signals to measure conductivity, depth is determined using the scale of the seismic wavelength and velocity. The resistance resolution is set by the assumption that seismic dispersion is much less than electromagnetic dispersion and the assumption that the change in EM spectral content can be measured at the surface. The validity of the last assumption depends on the conductivity between the first and second horizons compared to the average conductivity between the earth's surface and the first horizon.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
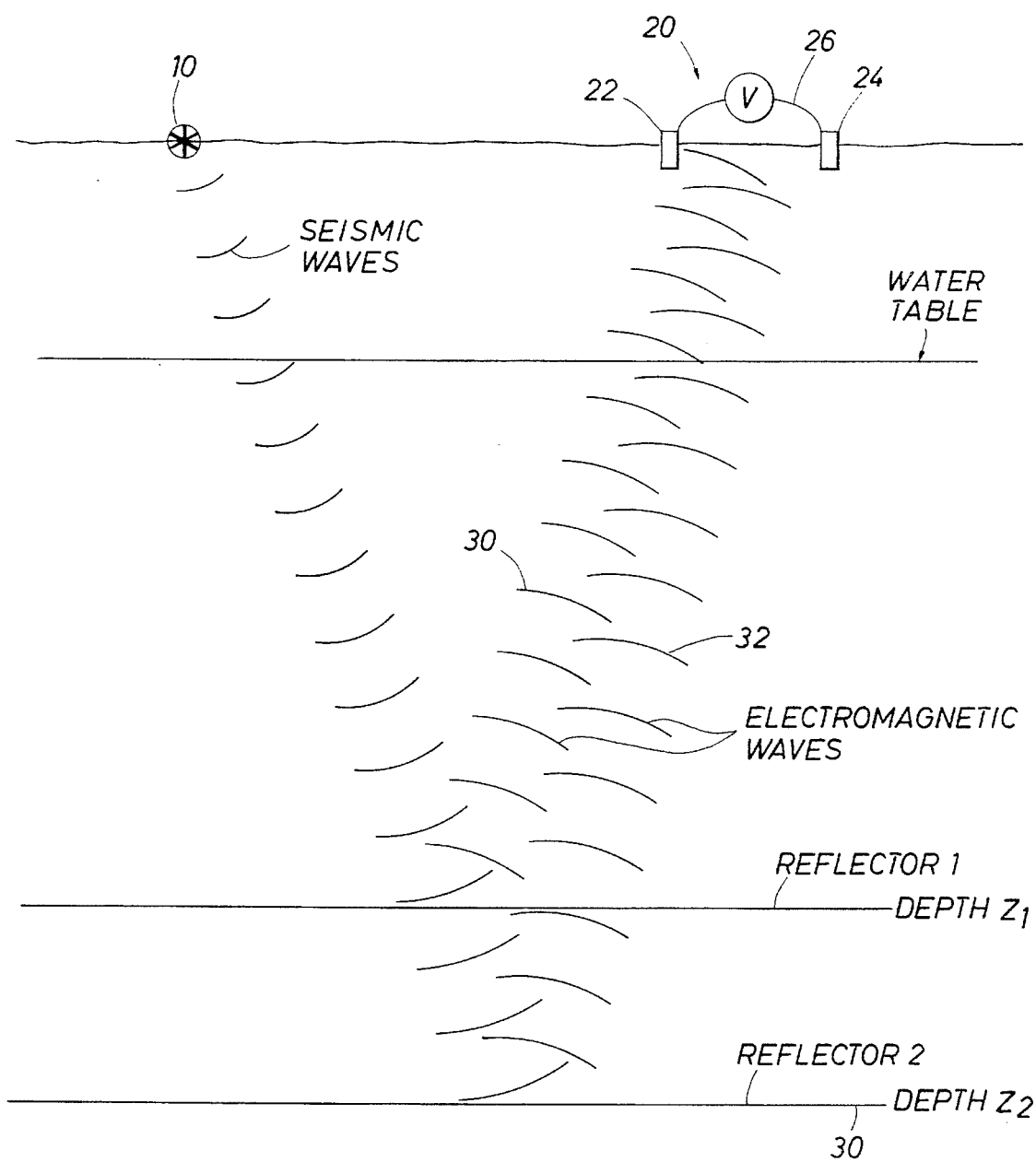
FIG. 1 illustrates measurement of reflected EM waves from different formations to determine resistivity according to the present invention.

Referring now to FIG. 1, a method and apparatus for measuring subsurface electrical resistance (conductivity) as a function of depth is shown. A source 10 is used to generate seismic energy as seismic waves into the earth, as shown. The seismic waves encounter first and second formations, referred to as reflector 1 and reflector 2. The first and second reflectors are preferably of a type that convert downgoing seismic waves into electromagnetic waves (seismoelectric conversion).

As discussed in the background, when the acoustical wave impacts a respective formation, a pressure gradient is established at the respective depth that displaces the fluid contained within the formation, and which passes downward through the fluid. According to the "streaming potential" theory, in porous lithological structures molecular bonds are disturbed or broken by the rapid movement of the fluid upon arrival of the acoustical or seismic wavefront. This effectively establishes a substantially vertical dipole throughout the depth of the formation and produces a vertical electric field in an upward vertical direction at the point of impact of the seismic wave against the formation. The electric field produces a corresponding electromagnetic wave 30 and 32 at the first and second reflectors, respectively, that emanates away from the impact region. For a more complete discussion of the manner in which certain formations convert seismic waves into electromagnetic waves, please see U.S. Pat. No. 4,904,942, which is hereby incorporated by reference.

The electromagnetic waves 30 and 32 are received by a suitable receptor, for example, an antenna 20 in the present embodiment. The antenna 20 includes two electrodes 22 and 24 placed on the earth's surface, as shown. It is noted that the antenna 20 may be placed either at or below the earth's surface, for example, in a borehole, as desired. In a preferred embodiment, the electrodes 22 and 24 are placed within a few feet of the surface. This placement is generally more convenient for field operations and is thought to provide similar data to buried electrodes. The use of other types of electromagnetic detectors in other arrangements is also contemplated. The antenna 20 includes an apparatus which records the data received, and these data are used according to the present invention to determine resistivity between reflectors 1 and 2.

Although the example shown in FIG. 1 uses electroseismic prospecting techniques where a downgoing seismic wave is used to generate EM waves back to the surface, it is noted that the inverse ESP effect can also be used where a downgoing EM wave is used to generate seismic waves back to the surface. Only the use of the ESP effect is discussed here for convenience, with the discussion applying similarly where inverse ESP effects are used. Whichever method is used, the difference in attenuation of the respective waves from reflectors 1 and 2 can be used to calculate resistance as a function of depth according to the present invention. It is also noted that, although only one source 10 and one receiver 20 are shown in FIG. 1 and discussed in this example, the use of multiple sources and/or multiple detectors in various configurations is also contemplated. In addition, the use of the present method in analyzing formations with greater than two reflectors is also contemplated.

The downgoing seismic wave generates two EM signals 30 and 32 at the reflectors 1 and 2, respectively which are detected by the antenna 20 at times $t_1$ and $t_2$. The electromagnetic waves 30 and 32 travel at the speed of light, while the downgoing seismic waves travel at the speed of sound. Therefore, the travel time of the EM waves 30 and 32 are essentially equivalent and instantaneous. Since electromagnetic waves 30 and 32 travel at a rate much faster than the seismic waves, it is assumed that the electromagnetic waves 30 and 32 reach the antenna at approximately the time the seismic waves reaches the respective reflector. Thus the difference in arrival times of the two EM waves 30 and 32 is essentially a measure of the travel time of the seismic wave between the first and second reflectors. Also, it is noted that, if the inverse ESP effect is being used, the difference in arrival times of the two received seismic waves would essentially be the travel time of the seismic wave between the first and second reflectors.

The depth-time relationship is used to convert the times $t_1$ and $t_2$ to depths $z_1$ and $z_2$ of the first and second reflectors, respectively. The combination of the arrival times with the seismic velocity (v) gives a measure of the depth interval $\Delta z = z_2 - z_1$ according to the equation $\Delta z = v \cdot (t_2 - t_1)$. This measurement of the depth interval is independent of the EM signal characteristics, such as frequency or amplitude.

The ESP measurement of formation resistance according to the present invention is based on the concept that the relative attenuation of the EM signals from depths $z_1$ and $z_2$ can be used to derive the average conductivity over that interval. If the amplitude of the EM signal 30 from depth $z_1$ is $A_1$, then the amplitude $A_2$ of the EM signal 32 corresponding to depth $z_2$ is $$A_2 = A_1 \ G \ exp \ (-\alpha_p \Delta z) \ exp \ (-\Delta z/\delta)$$

where G is a frequency-independent constant that accounts for geometrical spreading and reflection losses in the earth, $\delta$ is the EM skin depth, and $\alpha_p$ is the seismic wave attenuation that occurs between reflector 1 and reflector 2. The seismic wave attenuation $\alpha_p$ can be defined in terms of the seismic wave quality factor Q and the seismic wave velocity $V_p$, as follows:

$$\alpha_p = \frac{\pi f}{Q V_p} \quad (2)$$

The calculation of resistivity between reflector 1 and reflector 2 proceeds by determining the relative attenuation of the two EM signals 30 and 32. A variable referred to as $\alpha_{12}$ can be defined as the relative attenuation of the second EM wave 32 round trip between reflector 1 and reflector 2 due to the combined effects of the seismic and electromagnetic attenuation that occurs between reflector 1 and reflector 2 at a frequency f as follows:

$$\alpha_{12} = \alpha_p + \frac{1}{\delta} \quad (3)$$

where $\alpha_p$ is the seismic wave attenuation component and $1/\delta$ is the EM wave attenuation component. The manner in which $\alpha_{12}$ is calculated is discussed further below. It is noted that $\alpha_p$ will generally be negligible relative to $1/\delta$ and thus can usually be ignored.

Combining equation (3) with the definition of the EM skin depth $\delta$, $$\delta = \frac{1638}{\sqrt{\sigma f}} \quad (4)$$

the conductivity $\sigma$ over the depth interval $\Delta z$ can be calculated from $$\sigma = \frac{(1638)^2}{f} (\alpha_{12} - \alpha_p)^2 \quad (5)$$

As discussed immediately above, for most values of the conductivity, the seismic attenuation $\alpha_p$ is small enough to be neglected compared to the total attenuation $\alpha_{12}$. In a preferred embodiment, $\alpha_p$ is ignored, and only $\alpha_{12}$ is calculated. However, if $\alpha_p$ is known from seismic experiments, then the effect of seismic attenuation over the interval $\Delta z$ can be included in the conductivity calculation. In the usual case, knowledge of $\alpha_{12}$ and the frequency of interest f allows the conductivity $\sigma$ or resistivity $(1/\sigma)$ to be determined. By determining the depth of reflectors 1 and 2, resistivity as a function of depth can be determined.

Knowledge of the conductivity between the two reflectors allows a determination of the content of the formation, i.e. the presence or absence of oil or gas in the formation. The method of the present invention has substantial advantages over conventional EM methods. For example, the seismic travel time determines the depth of the measurement and the vertical resolution. In addition, the seismic wave is only a downgoing wave, and no reflected seismic waves are detected. Thus, the problems associated with creating an image from reflected seismic waves is not encountered. Also, since seismic waves are used in determining depth of the reflectors, and since seismic waves have a much greater resolution than EM waves, the resolution limits imposed by EM wavelengths are not encountered.

Determination of $\alpha_{12}$

Figure 2:
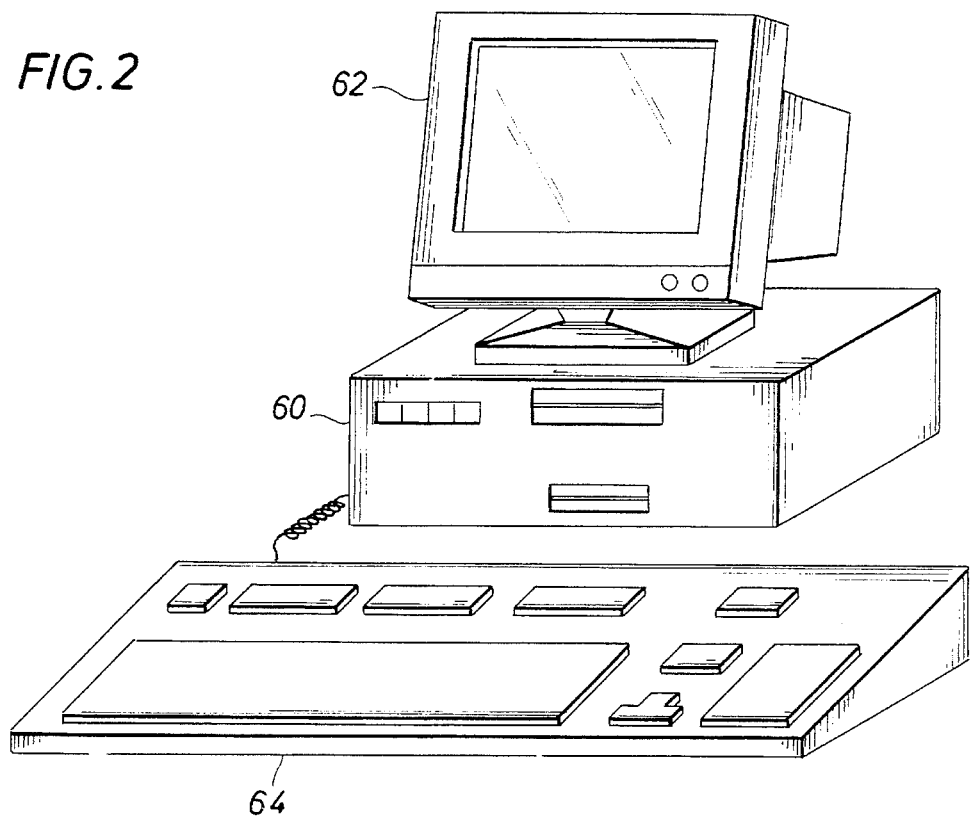
FIG. 2 illustrates a computer system used in analyzing received data according to one embodiment of the invention.

A number of different methods in either the time-domain or the frequency-domain can be used to determine the relative attenuation $\alpha_{12}$ from the received EM signals 30 and 32. These methods are preferably performed on a computer, such as a PC, workstation, or mainframe, if necessary. An exemplary computer including a system unit 60, a monitor 62 and keyboard 64 is illustrated in FIG. 2. The following two examples demonstrate the sensitivity and resolution of this measurement.

Average Frequency Method

Figure 3:
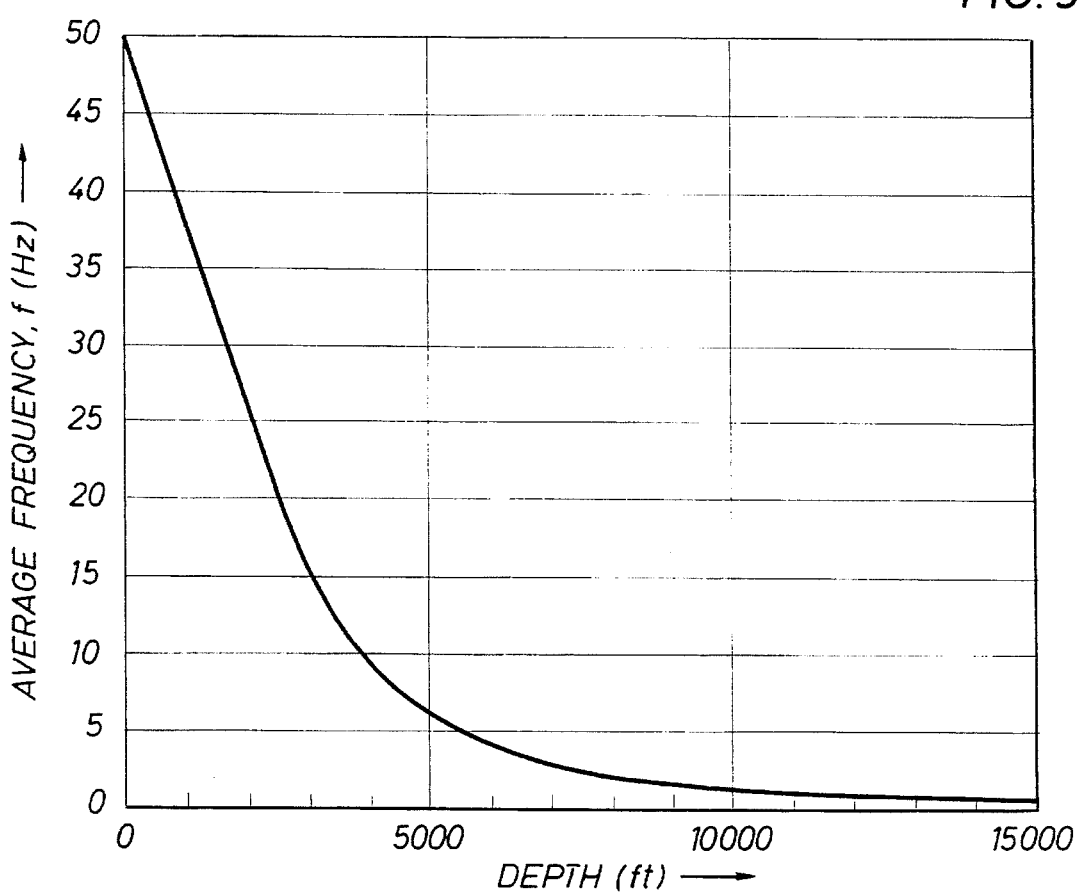
FIG. 3 is a graph illustrating average frequency as a function of depth for subsurface EM waves.

One measurement of relative attenuation is to determine the average frequency content of the pulses 30 and 32 at times $t_1$ and $t_2$. The average frequency of a broad-band pulse is shown in FIG. 3 as a function of the depth of the electroseismic conversion for a rock conductivity $\sigma = 0.1$ S/m, and an average source frequency of 50 Hz. The skin depth corresponding to the 50 Hz source frequency is 733 feet. FIG. 3 shows that there is substantial filtering of the high frequency components of the pulse for depths greater than the skin depth. FIG. 3 also shows that the resolution in the measurement of the average frequency content of the signal from depths $z_1$ and $z_2$ places limits on the resolution of the depth interval. If $\Delta z=100$ ft, then the change in average frequency of the signal is less than 1.5 Hz at all depths. If $\Delta z=500$ ft, then the change in average frequency of the signal is greater than 5 Hz for depths less than 2200 feet. The minimum depth interval $\Delta z$ depends on the ability to resolve small changes in the average frequency, which in turn depends on the signal-to-noise ratio and sampling rate of the antenna data.

Spectral Ratio Method

The spectral ratio method is a frequency-domain method for calculating the relative attenuation from the amplitude spectra $A_1(f)$ and $A_2(f)$ of the two EM signals. From Equation (1), the spectral ratio as a function of the frequency is:

$$\ln\left(\frac{A_1(f)}{A_2(f)}\right) = -\ln G + \frac{\pi \Delta z}{QV_p} f + \frac{\Delta z \sigma^{1/2}}{1638} f^{1/2} \qquad (6)$$

If the seismic attenuation is negligible compared to the EM attenuation, then a plot of $\ln(A_1/A_2)$ vs. $f^{1/2}$ will be linear with a slope m. The conductivity over the interval $\Delta z$ can be calculated from $$\sigma = \left(\frac{1638 m}{\Delta z}\right)^2 \qquad (7)$$

If the seismic attenuation is not negligible, then the conductivity can be determined by fitting Equation (6) to the spectral ratio data, including the seismic attenuation term.

The accuracy of the conductivity estimate is dependent on an accurate estimate of the slope of ln $(A_1/A_2)$ vs. $f^{1/2}$. The signal-to-noise ratio of the antenna data determines the minimum slope m that can be determined from the spectral ratio plot. For example, if the signal-to-noise ratio is such that $A_1/A_2$ must change by 10% over a frequency band from 20 to 80 Hz for the slope m to be distinguishable from background noise and if the conductivity is $\sigma=0.1$ S/m, the depth interval $\Delta z$ must be larger than 250 feet, which is comparable to the seismic wavelength.

The vertical resolution of the conductivity estimate for both the average frequency and spectral ratio methods is limited by the requirement that the arrival times $t_1$ and $t_2$ of the EM signals be sufficiently separated in time. For example, to define the change in average frequency between $t_1$ and $t_2$, there must be at least one cycle separating the two signals. This corresponds to a minimum depth interval $\Delta z$ of at least one seismic wavelength. Similarly, for the spectral ratio method, at least one cycle must separate the two signals to calculate an amplitude spectrum $A_1(f)$ for each event. Thus, the vertical resolution is limited by the requirement that $\Delta z$ be at least one seismic wavelength, and by the requirement that the relative attenuation over $\Delta z$ be distinguishable from noise.

The above examples illustrate the principles involved in measuring formation resistance from electroseismic effects. It is also helpful to define the conditions necessary for the ESP measurement to achieve better depth resolution than classical EM methods. If it is assumed that the seismic resolution is limited by the wavelength and the EM resolution is limited by the skin depth, then the ESP measurement has the same resolution as the EM measurement when $$\delta = \text{skin depth} = \frac{1638 \text{ ft}}{\sqrt{\sigma f}} = \frac{V_p}{f} = \lambda = \text{seismic wavelength}$$

Where $V_p$ is the seismic velocity. Solving for the frequency gives $$f_o = \frac{V_p^2 \sigma}{(1638)^2}$$

as the frequency where $\delta=\lambda$. Therefore, the frequency must be above $f_o$ for the ESP measurement to give resistivity depth resolution better than EM measurements. For typical parameters of $\sigma=0.1$ $(\Omega\text{-m})^{-1}$ and $V_p=6000$ ft/sec, $f_o=1.31$ Hz and $\delta=4560$ feet, it can then be expected that the ESP measurement of resistivity will be advantageous at a shallow depth, in a typical sedimentary basin less than 5000 feet.

The optimal resolution depends on the conductivity, the seismic velocity, and the detection resolution. From Equation (1) we have $$\frac{A_2}{A_1} \sim \exp - (\Delta z/\delta)$$

where the geometric spreading and seismic attenuation are neglected. If the amplitude resolution is, for example, 5% then $\Delta z/\delta \approx 1/16$. If it is further assumed that the spatial resolution, $\Delta z$, is equal to the seismic wavelength, then $\lambda/\delta=1/16$ or $$f_s = \sigma V_p^2 \left(\frac{16}{1638}\right)$$

where $f_s$ is the frequency where the seismic wavelength is equal to the depth resolution afforded by the detection resolution. When $\sigma=0.1$ $(\Omega\text{-m})^{-1}$ and $V_p=6000$ ft/sec, $f_s=339$ Hz, $\delta=284$ ft, and $\Delta z=\lambda=17.7$ feet. Therefore, in a typical sedimentary setting, depth resolution in a resistance measurement using ESP techniques can be expected to approach the limits imposed by the seismic wavelength, and be substantially better than EM resolution, when the depth of investigation is restricted to the first few hundred feet.

In conclusion, dispersion of EM and seismic pulses is dominated at all depths below the LVL by the EM wave dispersion, and seismic wave dispersion is typically negligible. The difference in dispersion between two or more received waves can then be used to estimate the formation conductivity as a function of depth. The measurement is limited by the signal amplitude and signal-to-noise ratio. Good depth resolution, limited by the seismic resolution, is possible at shallow depths when the ESP signal has sufficient amplitude to measure spectral ratios, which is typically a few thousand feet in sedimentary environments.

It is noted that measurements of formation resistance according to the present invention are particularly useful in shallow (less than 1000 feet) surveys. In these applications the enhanced depth resolution afforded by electroseismic conversion using methods of the present invention provides an advantage over classical EM methods, where depth resolution is poor. Applications of the present invention include the following examples.

1. Tracking pollutants in the near surface. Toxic liquids, such as hydrocarbons, in near-surface groundwaters alter the electrical resistance of pore fluids. Present EM methods can locate areas of high resistance associated with these fluids but cannot determine the depth of the pollutant with accuracy. The seismoelectric methods of the present invention provide a means for determining the depth of such migrations as well as the resistivity as a function of depth.

2. Groundwater hydrology—The description of aquifers, including their detailed flow patterns, is required for management of water resources, including monitoring seasonal variations, depletion of aquifers, dispersion of pollutants, and estimates of future availability. The methods for measuring ground resistance as a function of depth according to the present invention are useful in mapping the horizontal and vertical flow of aquifers.

3. Measurements of formation resistance as disclosed herein are also useful in tests between boreholes or between boreholes and the earth's surface.

4. As previously mentioned, all of the above applications may employ either a seismic source and electromagnetic detection or an electromagnetic source and seismic detection.

Having described the invention above, various modifications of the techniques, procedures, methods, material and equipment will be apparent to those in the art. It is intended that all such variations within the scope and spirit of the appended claims be embraced thereby.

What is claimed is:

1. A method of determining subsurface electrical resistance in geological formations as a function of depth, comprising the steps of:

placing an antenna comprising at least two electrodes at a receiving location;

initiating a seismic wave into the earth from a source location such that the seismic wavefront encounters two or more reflectors and is converted to electromagnetic waves at each said reflector;

detecting a first electromagnetic wave from a first reflector;

detecting a second electromagnetic wave from a second reflector, wherein said second reflector is at a distance farther removed from said source location; and determining the conductivity of the earth between said first and second reflectors and take distance from said source location to each of said first and second reflectors using said detected first and second electromagnetic waves.

2. The method of claim 1, wherein said step of determining includes determining the difference in attenuation between said first and second electromagnetic waves.

3. The method of claim 2, wherein said step of determining includes determining the wave attenuation of said second electromagnetic wave that occurs between said first and second reflectors.

4. The method of claim 3, wherein said step of determining only includes determining the amount of attenuation of said second electromagnetic wave that occurs between said first and second reflectors.

5. The method of claim 2, wherein said step of determining determines the conductivity between said first and second reflectors according to the equation:

$$\sigma = \frac{(1638)^2}{f} (\alpha_{12} - \alpha_p)^2$$

where f is a frequency of interest, $\alpha_{12}$ is the relative attenuation between said first and second electromagnetic waves caused by seismic and EM wave attenuation, and $\alpha_p$ is the seismic wave attenuation component between the first and second reflectors.

6. The method of claim 2, wherein said step of determining determines the conductivity between said first and second reflectors according to the equation:

$$\sigma = \frac{(1638)^2}{f} (\alpha_{12})^2$$

where f is a frequency of interest and $\alpha_{12}$ is the relative attenuation between said first and second electromagnetic waves.

7. The method of claims 5 or 6, wherein said step of determining includes determining the relative wave attenuation $\alpha_{12}$ using average frequency methods.

8. The method of claims 5 or 6, wherein said step of determining includes determining the relative wave attenuation $\alpha_{12}$ using spectral ratio methods.

9. The method of claim 1, further including the step of:

analyzing said determined conductivity as a function of depth to determine seismic qualities between said first and second reflectors.

10. The method of claim 1, wherein said step of determining includes calculating the distance between said first and second reflectors using the difference in arrival times of said first and second electromagnetic waves.

11. The method of claim 1, wherein said antenna is placed below the earth's surface and said source location is below the earth's surface.

12. The method of claim 1, wherein said antenna is placed on the earth's surface and said source location is on the earth's surface.

13. A method of determining subsurface electrical resistance in geological formations as a function of depth, comprising the steps of:

placing a seismic receptor at a receiving location;

initiating an electromagnetic wave into the earth from a source location such that the electromagnetic wavefront encounters two or more reflectors and is converted to seismic waves at each said reflector;

detecting a first seismic wave from a first reflector;

detecting a second seismic wave from a second reflector, wherein said second reflector is at a distance farther removed from said seismic receptor; and determining the conductivity of the earth between said first and second reflectors and the distance from said seismic receptor to each of said first and second reflectors using said detected first and second seismic waves.

14. The method of claim 13, wherein said step of determining includes determining the difference in attenuation between said first and second seismic waves.

15. The method of claim 14, wherein said step of determining includes determining the wave attenuation of said downgoing electromagnetic wave that occurs between said first and second reflectors.

16. The method of claim 15, wherein said step of determining only includes determining the amount of attenuation of said downgoing electromagnetic wave that occurs between said first and second reflectors.

17. The method of claim 14, wherein said step of determining determines the conductivity between said first and second reflectors according to the equation:

$$\sigma = \frac{(1638)^2}{f} (\alpha_{12} - \alpha_p)^2$$

where f is a frequency of interest, $\alpha_{12}$ is the relative attenuation between said first and second seismic waves caused by seismic and EM wave attenuation, and $\alpha_p$ is the seismic wave attenuation component between the first and second reflectors.

18. The method of claim 14, wherein said step of determining determines the conductivity between said first and second reflectors according to the equation:

$$\sigma = \frac{(1638)^2}{f} (\alpha_{12})^2$$

where f is a frequency of interest and $\alpha_{12}$ is the relative attenuation between said first and second seismic waves.

19. The method of claims 17 or 18, wherein said step of determining includes determining the relative wave attenuation $\alpha_{12}$ using average frequency methods.

20. The method of claims 17 or 18, wherein said step of determining includes determining the relative wave attenuation an using spectral ratio methods.

21. The method of claim 13, further including the step of:
analyzing said determined conductivity as a function of depth to determine seismic qualities between said first and second reflectors.

22. The method of claim 13, wherein said step of determining includes calculating the distance between said first and second reflectors using the difference in arrival times of said first and second seismic waves.

23. The method of claim 1, wherein the receiving location is below the earth's surface and the source location is on the earth's surface.

24. The method of claim 1, wherein the receiving location is on the earth's surface and the source location is below the earth's surface.

25. The method of claim 13, wherein said seismic receptor is placed below the earth's surface and said source location is below the earth's surface.

26. The method of claim 13, wherein said seismic receptor is placed below the earth's surface and said source location is on the earth's surface.

27. The method of claim 13, wherein said seismic receptor is placed on the earth's surface and said source location is below the earth's surface.

28. The method of claim 13, wherein said seismic receptor is placed on the earth's surface and said source location is on the earth's surface.

* * * * *